United States Patent
Tseng et al.

(10) Patent No.: US 11,271,385 B2
(45) Date of Patent: Mar. 8, 2022

(54) ABNORMAL-VOLTAGE PROTECTION APPARATUS AND METHOD OF OPERATING THE SAME

(71) Applicant: DELTA ELECTRONICS, INC., Taoyuan (TW)

(72) Inventors: Yu-Chieh Tseng, Taoyuan (TW); Chia-Hao Yeh, Taoyuan (TW); Likai Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 198 days.

(21) Appl. No.: 16/180,559

(22) Filed: Nov. 5, 2018

(65) Prior Publication Data

US 2020/0036181 A1    Jan. 30, 2020

(30) Foreign Application Priority Data

Jul. 27, 2018    (CN) .......................... 201810839882.9

(51) Int. Cl.
*H02H 3/20*    (2006.01)
*H02H 3/06*    (2006.01)
*H02H 1/00*    (2006.01)

(52) U.S. Cl.
CPC ............ *H02H 3/20* (2013.01); *H02H 1/0007* (2013.01); *H02H 3/06* (2013.01)

(58) Field of Classification Search
CPC .......... H02H 3/20; H02H 3/06; H02H 1/0007; H02H 3/066; H02H 3/207; H03K 17/28; H03K 17/08
USPC .................................................. 361/86, 91.1
See application file for complete search history.

(56) References Cited

U.S. PATENT DOCUMENTS

| | | | | |
|---|---|---|---|---|
| 5,835,328 A | * | 11/1998 | Maloney ................ | H02H 9/046 361/111 |
| 2005/0195538 A1 | * | 9/2005 | Khoroshev ............ | H02H 3/066 361/42 |
| 2010/0052432 A1 | * | 3/2010 | Seidler ................... | H02M 1/12 307/105 |
| 2014/0153140 A1 | * | 6/2014 | Hart ....................... | H02H 3/202 361/18 |
| 2015/0026486 A1 | * | 1/2015 | Liu ........................ | H02H 3/087 713/300 |

(Continued)

FOREIGN PATENT DOCUMENTS

TW            201505305 A        2/2015

*Primary Examiner* — Dharti H Patel
(74) *Attorney, Agent, or Firm* — Muncy, Geissler, Olds & Lowe, P.C.

(57) ABSTRACT

An abnormal-voltage protection apparatus includes a switch unit, a voltage detection unit, and a delay time control unit. The switch unit is coupled to a power supplying path formed between an AC power source and a load. The voltage detection unit detects the AC power source and provides a detection signal. The delay time control unit is coupled to the voltage detection unit and the switch unit, and receives the detection signal and provides a control signal to the switch unit according to the detection signal. When the voltage detection unit detects that the AC power source changes from an abnormal voltage to a normal voltage, the delay time control unit turns on the switch unit by the control signal after a delay time so that the AC power source supplies power to the load through the power supplying path.

13 Claims, 7 Drawing Sheets

(56) References Cited

U.S. PATENT DOCUMENTS

2015/0029618 A1* 1/2015 Collins ................ H02H 7/1213
361/18
2017/0033706 A1* 2/2017 Usami ................. H02M 1/4225
2019/0123661 A1* 4/2019 Iyasu .................... H02M 7/217

* cited by examiner

ABNORMAL-VOLTAGE PROTECTION APPARATUS AND METHOD OF OPERATING THE SAME

BACKGROUND

Technical Field

The present disclosure relates to an abnormal-voltage protection apparatus and a method of operating the same, and more particularly to an abnormal-voltage protection apparatus with delay time function and a method of operating the same.

Description of Related Art

The statements in this section merely provide background information related to the present disclosure and do not necessarily constitute prior art.

In the countries or regions where the mains supplies are unstable, the abnormal high voltage or low voltage causes electrical appliances to malfunction or even damage in slight conditions, or causes fire hazard accidents in home appliances or even damage to personal safety and property in serious conditions.

At present, the existing protection apparatus with abnormal-voltage detection usually comprises a voltage detection circuit and a relay switch. Please refer to FIG. 1, which shows a block circuit diagram of a protection apparatus with abnormal-voltage detection of the related art. The protection apparatus with abnormal-voltage detection comprises a voltage detection circuit 20A and a relay switch 10A coupled between an AC power source $V_{AC}$ and a load 90A.

When the voltage detection circuit 20A detects that the AC power source $V_{AC}$ is in an abnormal high voltage or an abnormal low voltage, the voltage detection circuit 20A provides a control signal $S_A$ to turn off the relay switch 10A, thereby avoiding the abnormal AC power source $V_{AC}$ supplying power to the load 90A. On the contrary, when the voltage detection circuit 20A detects that the AC power source $V_{AC}$ returns to be normal from the abnormal voltage, the voltage detection circuit 20A provides the control signal $S_A$ to turn on the relay switch 10A so that the normal AC power source $V_{AC}$ supplies power to the load 90A again.

However, in the initial stage of returning to be normal from the abnormal voltage, the AC power source $V_{AC}$ is likely to be in the abnormal voltage again since the AC power source $V_{AC}$ is still in an unstable condition. At this condition, the relay switch 10A would be frequently activated when the AC power source $V_{AC}$ is not completely stable and the relay switch 10A is immediately turned on, thereby reducing life span of the relay switch 10A, and even failing to provide efficient and safe power supply to the load 90 or rear-end circuits.

SUMMARY

An objective of the present disclosure is to provide an abnormal-voltage protection apparatus to solve problems of reducing life span of the relay switch, and even failing to provide efficient and safe power supply to the load or rear-end circuits when the relay switch is damaged due to its frequent activation.

In order to achieve the above-mentioned objective, the abnormal-voltage protection apparatus comprises a switch unit, a voltage detection unit, and a delay time control unit. The switch unit is coupled to a power supplying path formed between an AC power source and a load. The voltage detection unit detects the AC power source and provides a detection signal according to a voltage value of the AC power source. The delay time control unit is coupled to the voltage detection unit and the switch unit, and receives the detection signal and provides a control signal to the switch unit according to the detection signal. When the voltage detection unit detects that the AC power source changes from an abnormal voltage to a normal voltage, the delay time control unit turns on the switch unit by the control signal after a delay time so that the AC power source supplies power to the load through the power supplying path.

Accordingly, the abnormal-voltage protection apparatus is provided to provide efficient and safe power supply to the load or rear-end circuits and extend life span of the relay switch or switch unit.

Another objective of the present disclosure is to provide a method of operating an abnormal-voltage protection apparatus to solve problems of reducing life span of the relay switch, and even failing to provide efficient and safe power supply to the load or rear-end circuits when the relay switch is damaged due to its frequent activation.

In order to achieve the above-mentioned objective, the abnormal-voltage protection apparatus comprises a switch unit coupled between an AC power source and a load, a voltage detection unit, and a delay time control unit. The method comprises steps of: (a) detecting, by the voltage detection unit, a voltage value of the AC power source; (b) performing, by the delay time control unit, a delay time procedure when the AC power source changes from an abnormal voltage to a normal voltage; and (c) turning on, by the delay time control unit, the switch unit to make the AC power source supply power to the load through the switch unit after a delay time provided during the delay time procedure and the AC power source maintains in the normal voltage.

Accordingly, the method of operating the abnormal-voltage protection apparatus is provided to provide efficient and safe power supply to the load or rear-end circuits and extend life span of the relay switch or switch unit.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
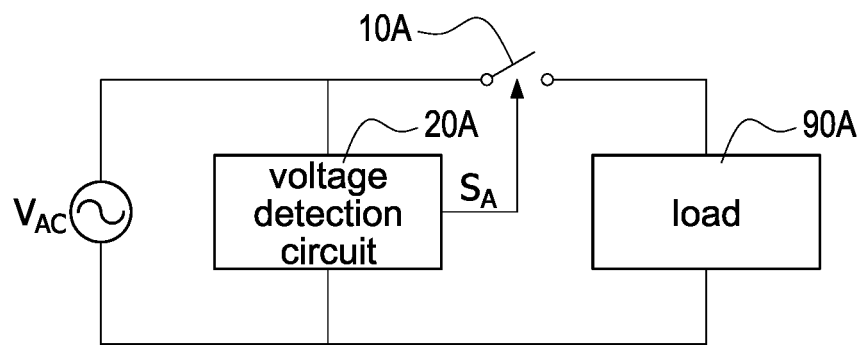
FIG. 1 is a block circuit diagram of a protection apparatus with abnormal-voltage detection of the related art.

Reference will now be made to the drawing figures to describe the present disclosure in detail. It will be understood that the drawing figures and exemplified embodiments of present disclosure are not limited to the details thereof.

Figure 2:
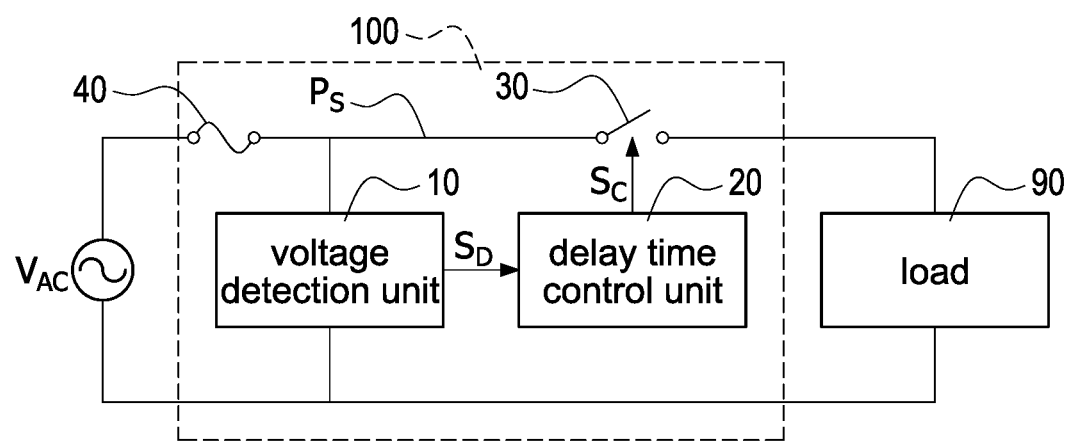
FIG. 2 is a block circuit diagram of an abnormal-voltage protection apparatus according to the present disclosure.

Please refer to FIG. 2, which shows a block circuit diagram of an abnormal-voltage protection apparatus according to the present disclosure. The abnormal-voltage protection apparatus 100 is coupled between an AC power source $V_{AC}$ and a load 90. A rated voltage of the AC power source $V_{AC}$ may be, for example but not limited to, 230 volts AC. Further, the load 90 may be, for example but not limited to, household appliances supplied with AC power, such as air conditioners, refrigerators, or so on.

The abnormal-voltage protection apparatus 100 comprises a voltage detection unit 10, a delay time control unit 20, and a switch unit 30. The switch unit 30 is coupled to a power supplying path $P_S$ formed between the AC power source $V_{AC}$ and the load 90. In one embodiment, the switch unit 30 is, for example but not limited to, a relay switch. In other embodiments, any of the switch elements, which can disconnect and connect the power supplying path $P_S$, may be used as the switch unit 30.

The voltage detection unit 10 is coupled to the AC power source $V_{AC}$, and receives the AC power source $V_{AC}$ and provides a detection signal $S_D$ according to a voltage value of the AC power source $V_{AC}$. The detection signal $S_D$ provided by the voltage detection unit 10 is corresponding to the voltage value of the AC power source $V_{AC}$. Also, the electrical information, such as voltage, current, frequency, and so on of the AC power source $V_{AC}$ can be acquired according to the detection signal $S_D$.

The delay time control unit 20 is coupled to the voltage detection unit 10 and the switch unit 30. The delay time control unit 20 receives the detection signal $S_D$ and provides a control signal $S_C$ according to the detection signal $S_D$, i.e., the electrical information of the AC power source $V_{AC}$. Further, the control signal $S_C$ is provided to control turning on or turning off the switch unit 30 so as to connect or disconnect the power supplying path $P_S$, thus controlling the AC power source $V_{AC}$ to supply or interrupt power to the load 90, detailed description later.

The abnormal-voltage protection apparatus 100 further comprises a fuse unit 40, and the fuse unit 40 is coupled in series to the power supplying path $P_S$ formed between the AC power source $V_{AC}$ and the load 90. When a current flowing through the power supplying path $P_S$ is excessive, the fuse unit 40 is disconnected to interrupt the current flowing to the load 90, thereby providing an overcurrent protection for the load 90.

Figure 3:
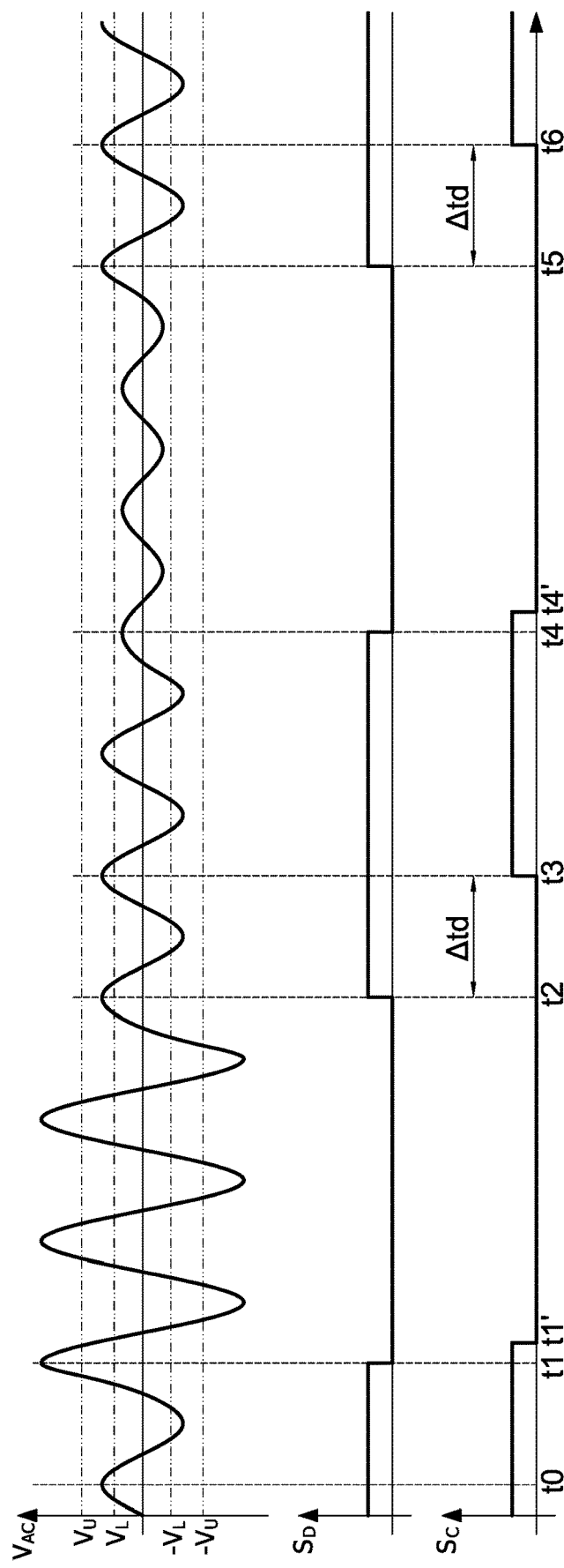
FIG. 3 is a schematic waveform of a delay control mechanism according to the present disclosure.

Please refer to FIG. 3, which shows a schematic waveform of a delay control mechanism according to the present disclosure. From top to bottom, FIG. 3 presents the AC power source $V_{AC}$, the detection signal $S_D$, and the control signal $S_C$. FIG. 3 further presents level transitions of the detection signal $S_D$ and the control signal $S_C$ corresponding to the AC power source $V_{AC}$ be in the abnormal high/low voltage and the normal voltage, detailed description as follows.

For convenience, take the AC power source $V_{AC}$ rated at 230 volts for example. Therefore, an upper threshold voltage value $V_U$ may be predetermined to be a specific value, such as 276 volts or to be a percentage increment value, such as 253 volts, i.e., an increment by 10% of the AC power source $V_{AC}$ rated at 230 volts. Accordingly, the upper threshold voltage value $V_U$ is used to determine whether the AC power source $V_{AC}$ is in the abnormal high voltage. In other words, when a voltage value of the AC power source $V_{AC}$ is greater than the upper threshold voltage value $V_U$, such as 276 volts, the voltage detection unit 10 detects that the AC power source $V_{AC}$ is in the abnormal high voltage.

Moreover, a lower threshold voltage value $V_L$ may be predetermined to be a specific value, such as 184 volts or to be a percentage decrement value, such as 207 volts, i.e., a decrement by 10% of the AC power source $V_{AC}$ rated at 230 volts. Accordingly, the lower threshold voltage value $V_L$ is used to determine whether the AC power source $V_{AC}$ is in the abnormal low voltage. In other words, when the voltage value of the AC power source $V_{AC}$ is less than the lower threshold voltage value $V_L$, such as 184 volts, the voltage detection unit 10 detects that the AC power source $V_{AC}$ is in the abnormal low voltage.

Incidentally, the foregoing "greater than" or "less than" is only a relationship indicating the magnitude of the voltage. Similarly, "greater than or equal to" or "less than or equal to" is also used to indicate whether the AC power source $V_{AC}$ is in the abnormal high/low voltage. In one embodiment, a peak voltage of the AC power source $V_{AC}$ is compared with the upper threshold voltage value $V_U$ and/or the lower threshold voltage value $V_L$ to determine whether the AC power source $V_{AC}$ is in the abnormal high/low voltage.

It is assumed that the switch unit 30 is initially turned on, and therefore the AC power source $V_{AC}$ normally supplies power to the load 90 through the power supplying path $P_S$. At a time point t0, the voltage detection unit 10 detects that a peak voltage of the AC power source $V_{AC}$ is greater than the lower threshold voltage value $V_L$ and lower than the upper threshold voltage value $V_U$. In other words, the voltage detection unit 10 detects that the AC power source $V_{AC}$ is normal, and therefore the detection signal $S_D$ can be maintained at a high-level state. At this condition, the delay time control unit 20 receives the high-level detection signal $S_D$ and continuously provides the control signal $S_C$ with a high-level state to continuously turn on the switch unit 30.

At a time point t1, the voltage detection unit 10 detects that the peak voltage of the AC power source $V_{AC}$ is greater than the upper threshold voltage value $V_U$, i.e., the voltage detection unit 10 detects that the AC power source $V_{AC}$ is in an abnormal high voltage, and therefore the detection signal $S_D$ provided from the voltage detection unit 10 is transited, for example but not limited to, from a high-level state to a low-level state. At this time, the delay time control unit 20 receives the low-level detection signal $S_D$ to provide the control signal $S_C$, such as a low-level signal at a time point t1' to turn off the switch unit 30, thereby interrupting the abnormal high-voltage AC power source $V_{AC}$ supplying power to the load 90 and preventing the load 90 being affected by the abnormal high-voltage AC power source $V_{AC}$.

After the time point t1, the voltage detection unit 10 continuously detects that the AC power source $V_{AC}$ is in the abnormal high voltage, and therefore the detection signal $S_D$ is still maintained at the low-level state. Also, the control signal $S_C$ is still maintained at the low-level state to continuously turn off the switch unit 30.

Until a time point t2, the detection signal $S_D$ provided from the voltage detection unit 10 is transited from the low-level state to the high-level state since the voltage detection unit 10 detects that the peak voltage of the AC power source $V_{AC}$ is greater than the lower threshold voltage value $V_L$ and less than the upper threshold voltage value $V_U$, i.e., the voltage detection unit 10 detects that the AC power source $V_{AC}$ returns to be normal. At this time, the delay time control unit 20 activates a delay control mechanism as explained below.

When the voltage detection unit 10 detects that the AC power source $V_{AC}$ returns to be normal and the switch unit 30 is immediately turned on by the control signal $S_C$ provided by the delay time control unit 20 to supply power to the load 90, there would be following problems in the actual operation. When the AC power source $V_{AC}$ returns to be normal, the AC power source $V_{AC}$ is likely to be in the abnormal voltage again since the AC power source $V_{AC}$ is still in an unstable condition. At this condition, the voltage detection unit 10 again detects that the AC power source $V_{AC}$ is in the abnormal high voltage. Also, the control signal $S_C$ provided by the delay time control unit 20 turns off the switch unit 30 to interrupt the abnormal high-voltage AC power source $V_{AC}$ supplying power to the load 90.

The switch unit 30 would be frequently activated when the AC power source $V_{AC}$ is not completely stable and the switch unit 30 is immediately turned on, thereby reducing life span of the switch unit 30. Once the switch unit 30 is damaged during operation, the switch unit 30 cannot be controlled by the control signal $S_C$. The slight situation, i.e., a disconnected damage may always disconnect the AC power source $V_{AC}$ supplying power to the load 90 even though the AC power source $V_{AC}$ has returned to be normal. The serious situation, i.e., a connected damage may always connect the AC power source $V_{AC}$ to supply power to the load 90 even though the AC power source $V_{AC}$ is in the abnormal high voltage. Accordingly, it is unable to provide efficient and safe power supply to the load 90 or rear-end circuits, and therefore the delay control mechanism activated by the delay time control unit 20 is necessary in order to solve the problem.

At a time point t2, the detection signal $S_D$ provided from the voltage detection unit 10 is transited, for example but not limited to, from the low-level state to the high-level state since the voltage detection unit 10 detects that the AC power source $V_{AC}$ returns to be normal. When the delay time control unit 20 receives the detection signal $S_D$ transited from the low-level state to the high-level state, i.e., the voltage detection unit 10 detects that the AC power source $V_{AC}$ returns to be normal from the abnormal high voltage, the delay time control unit 20 turns on the switch unit 30 by the control signal $S_C$ after a delay time Δtd, i.e., at a time point t3, and therefore the AC power source $V_{AC}$ supplies power to the load 90 through the power supplying path $P_S$.

As shown in FIG. 3, a length of the delay time Δtd may be the length of one cycle, i.e., a time interval between the time point t2 and the time point t3, and two adjacent peak voltages are corresponding to the two time points t2, t3. However, the length of the delay time Δtd may be designed according to requirements or considerations of the actual application, for example, two cycles, three cycles, or one-half cycle. In one embodiment, the delay time control unit 20 adjusts the delay time Δtd according to a duration time of the abnormal voltage. The duration time represents a time interval from the occurrence of the abnormal voltage to the return of the normal voltage. Therefore, the delay time Δtd can be flexibly set and adjusted according to the duration time. For example, when the abnormal high/low voltage lasts for a longer time, the delay time Δtd is extended. In one embodiment, when the abnormal high/low voltage occurs, the delay time control unit 20 starts timing, and then ends timing until the AC power source $V_{AC}$ returns to be normal. Also, the time interval is recorded to be as the duration time, and further the delay time Δtd is flexibly adjusted according to the value of the duration time.

In one embodiment, the delay time control unit 20 adjusts the delay time Δtd according to a magnitude of the abnormal voltage. The delay time Δtd can be flexibly set and adjusted according to the abnormal high degree or abnormal low degree of the AC power source $V_{AC}$. For example, when the abnormal high/low degree is greater, the delay time Δtd is extended. In one embodiment, the abnormal high degree represents a voltage difference that the magnitude of the abnormal voltage is higher than the upper threshold voltage value $V_U$, and the abnormal low degree represents a voltage difference that the magnitude of the abnormal voltage is lower than the lower threshold voltage value $V_L$. When the voltage difference is greater, the delay time Δtd is extended. Once the AC power source $V_{AC}$ is to be in the abnormal voltage again within the delay time Δtd, the control signal $S_C$ is continuously low-level to continuously turn off the switch unit 30, thereby interrupting the abnormal AC power source $V_{AC}$ supplying power to the load 90.

Besides the peak voltage, a valley voltage of the AC power source $V_{AC}$ can be also detected by the voltage detection unit 10 to determine whether the AC power source $V_{AC}$ is in the abnormal high/low voltage. When the voltage detection unit 10 detects that the valley voltage of the AC power source $V_{AC}$ is less than a negative upper threshold voltage value $V_U$, i.e., $-V_U$, the voltage detection unit 10 detects that the AC power source $V_{AC}$ is in the abnormal high voltage. When the voltage detection unit 10 detects that the valley voltage of the AC power source $V_{AC}$ is greater than a negative lower threshold voltage value $V_L$, i.e., $-V_L$, the voltage detection unit 10 detects that the AC power source $V_{AC}$ is in the abnormal low voltage. When the voltage detection unit 10 detects that the valley voltage of the AC power source $V_{AC}$ is greater than the negative the upper threshold voltage value $V_U$ and less than the negative lower threshold voltage value $V_L$, the voltage detection unit 10 detects that the AC power source $V_{AC}$ is normal.

The accumulation of the delay time Δtd can be implemented by a hardware manner, such as a delay time circuit or other digital or analog circuits, a firmware manner, or a software manner by the delay time control unit 20. The following will be explained by the hardware circuit.

Figure 4A:
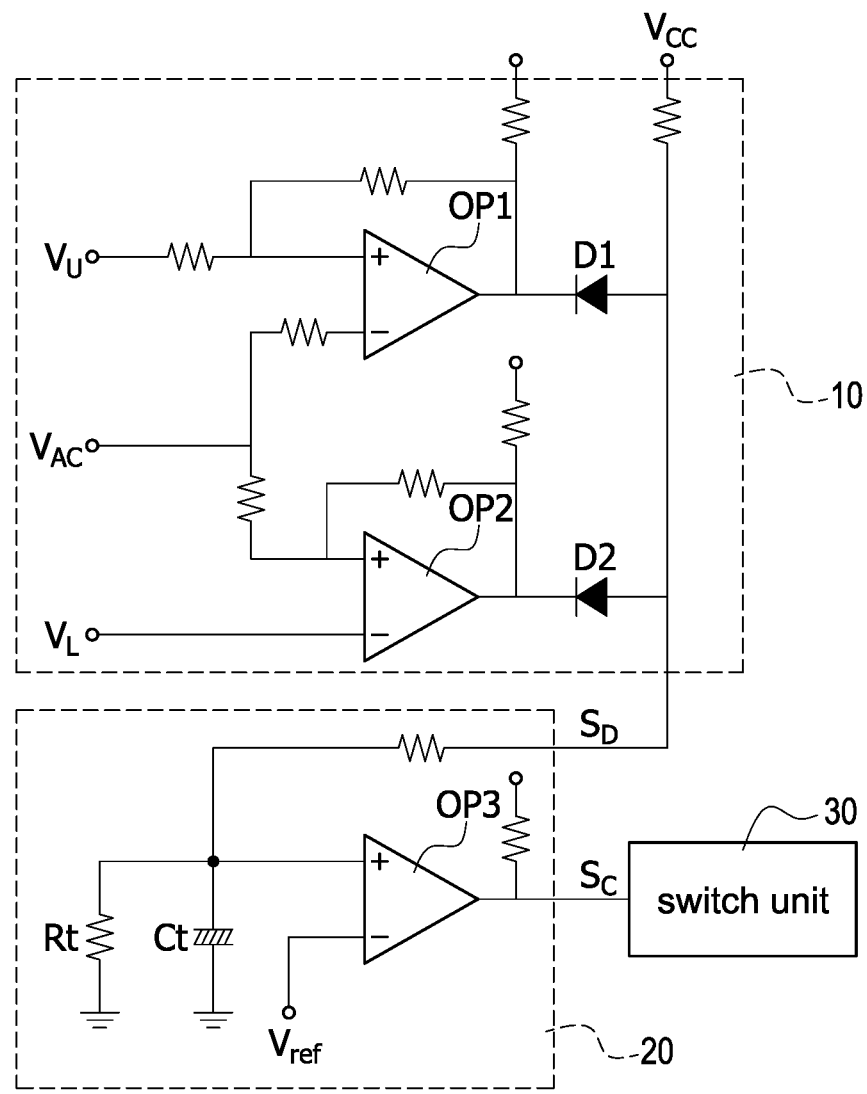
FIG. 4A is a circuit diagram of a delay time control unit according to a first embodiment of the present disclosure.
Figure 4B:
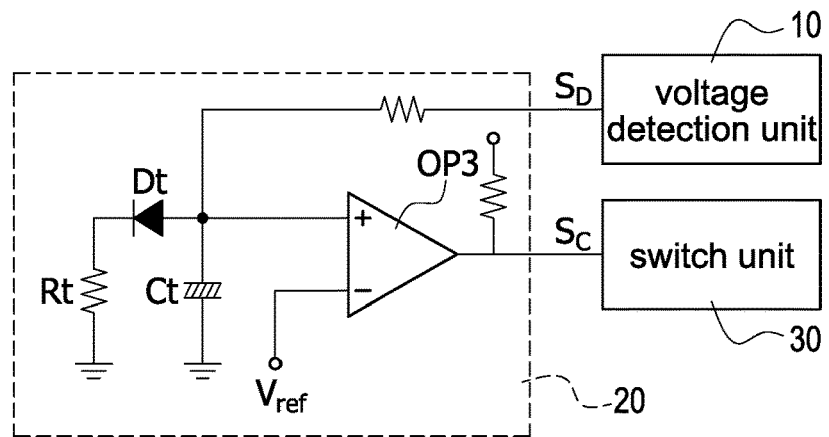
FIG. 4B is a circuit diagram of the delay time control unit according to a second embodiment of the present disclosure.

Please refer to FIG. 4A and FIG. 4B, which show circuit diagrams of the delay time control unit according to a first embodiment and a second embodiment of the present disclosure, respectively. The voltage detection unit 10 comprises a first comparator OP1, a second comparator OP2, a first diode D1, and a second diode D2. As shown in FIG. 4A, two input ends of the first comparator OP1 receive the upper threshold voltage value $V_U$ and the AC power source $V_{AC}$, respectively; two input ends of the second comparator OP2 receive the lower threshold voltage value $V_L$ and the AC power source $V_{AC}$, respectively. In particular, the voltages $V_U$, $V_L$, $V_{AC}$ received by the comparators OP1, OP2 are actually voltage signals corresponding to the upper threshold voltage value $V_U$, the lower threshold voltage value $V_L$, and the AC power source $V_{AC}$ rather than voltages with value of hundreds of volts. An output end of the first comparator OP1 is coupled to a cathode end of the first diode D1, an output end of the second comparator OP2 is coupled a cathode end of the second diode D2, and an anode end of the first diode D1 and an anode end of the second diode D2 are coupled to a supply voltage Vcc.

The delay time control unit 20 comprises a third comparator OP3, a resistor Rt, and a capacitor Ct. As shown in FIG. 4A, a first input end, such as a non-inverting input end of the third comparator OP3 is coupled to the resistor Rt, the capacitor Ct, and the supply voltage Vcc, and receives the detection signal $S_D$ provided from the voltage detection unit 10. The resistor Rt is coupled between the first input end of the third comparator OP3 and a ground end. The capacitor Ct is coupled between the first input end of the third comparator OP3 and the ground end. A second input end, such an inverting input end of the third comparator OP3 receives a reference voltage Vref. In addition, the reference voltage Vref may be provided by dividing an external voltage by a resistor divider network, which is coupled to the second input end of the third comparator OP3. The first input end of the third comparator OP3 receives the detection signal, the second input end of the third comparator OP3 receives a reference voltage, and the output end of the third comparator OP3 outputs the control signal $S_C$.

A resistance value R of the resistor Rt and a capacitance value C of the capacitor Ct of the delay time control unit 20 determine a RC time constant, i.e., $\tau=RC$ of charging/discharging operation, and therefore a reset function can be implemented. Specifically, when the peak voltage of the AC power source $V_{AC}$ is greater than the upper threshold voltage value $V_U$, i.e., the AC power source $V_{AC}$ is in the abnormal high voltage, the first diode D1 is forward biased, or when the peak voltage of the AC power source $V_{AC}$ is less than the lower threshold voltage value $V_L$, i.e., the AC power source $V_{AC}$ is in the abnormal low voltage, the second diode D2 is forward biased, the detection signal $S_D$ outputted from the voltage detection unit 10 is transited from the high-level state to the low-level state through the first diode D1 (in the abnormal high voltage at the time point t1 shown in FIG. 3) or through the second diode D2 (in the abnormal low voltage at the time point t4 shown in FIG. 3). At this condition, the capacitor Ct discharges through the resistor Rt. When a capacitor voltage (or referred to as "first voltage") across two ends of the capacitor Ct is less than the reference voltage Vref, the control signal $S_C$ outputted from the third comparator OP3 is transited from the high-level state to the low-level state, thereby turning off the switch unit 30 and interrupting the abnormal AC power source $V_{AC}$ supplying power to the load 90.

On the contrary, when the peak voltage of the AC power source $V_{AC}$ is less than the upper threshold voltage value $V_U$ and greater than the lower threshold voltage value $V_L$, i.e., the AC power source $V_{AC}$ is normal or returns to be normal, both the first diode D1 and the second diode D2 are reverse biased. At this condition, the capacitor Ct is charged by the supply voltage Vcc. When the capacitor voltage, i.e., the first voltage across two ends of the capacitor Ct is greater than the reference voltage Vref, the control signal $S_C$ outputted from the third comparator OP3 is transited from the low-level state to the high-level state, thereby turning on the switch unit 30 and supplying the normal AC power source $V_{AC}$ to the load 90. In this embodiment, the duration time from the start of charging the capacitor Ct (for example, from zero volt) to the capacitor voltage being greater than the reference voltage Vref is the delay time $\Delta td$, and therefore the resistance value of the resistor Rt and the capacitance value C of the capacitor Ct can be designed to adjust the length of the delay time $\Delta td$. So, the delay time control unit 20 is configured to produce a first voltage according to the detection signal $S_D$, and compare the first voltage with a reference voltage Vref to produce the control signal $S_C$. And when the AC power source $V_{AC}$ changes from the abnormal voltage to the normal voltage, the delay time control unit 20 is further configured to increase the first voltage, and change a level of the control signal $S_A$ to turn on the switch unit 30 until the first voltage is greater than the reference voltage Vref.

Moreover, as the second embodiment shown in FIG. 4B, a diode Dt has a cathode end and an anode end. The cathode end of the diode Dt is coupled to the resistor Rt, and the anode end of the diode Dt is coupled to the capacitor Ct. The diode Dt is coupled between the resistor Rt and the capacitor Ct of the delay time control unit 20 in comparison with the first embodiment shown in FIG. 4A, and the diode Dt is used to provide an effective current discharging path for the capacitor Ct. Since the voltage detection unit 10 shown in FIG. 4B is identical to the voltage detection unit 10 shown in FIG. 4A, it is only illustrated in a block diagram. The detail description of the voltage detection unit 10 can refer to description of the corresponding FIG. 4A and is omitted here for conciseness.

Figure 4C:
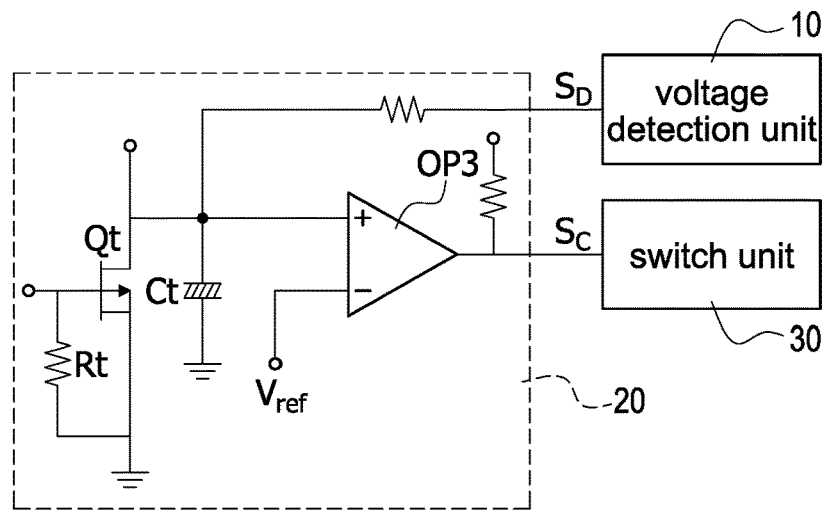
FIG. 4C is a circuit diagram of the delay time control unit according to a third embodiment of the present disclosure.
Figure 4D:
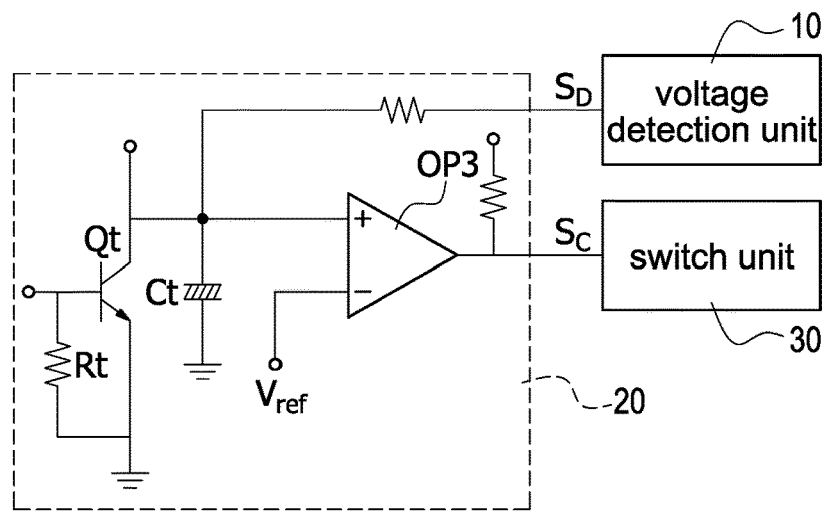
FIG. 4D is a circuit diagram of the delay time control unit according to a fourth embodiment of the present disclosure.

Please refer to FIG. 4C and FIG. 4D, which show circuit diagrams of the delay time control unit according to a third embodiment and a fourth embodiment of the present disclosure, respectively. In comparison with the first embodiment shown in FIG. 4A, a transistor switch Qt (for example, a MOSFET shown in FIG. 4C, and a BJT shown in FIG. 4D) is further coupled between the resistor Rt and the capacitor Ct of the delay time control unit 20. Also, the transistor switch Qt is controlled by an external signal to provide an effective current discharging path for the capacitor Ct. The transistor switch Qt is coupled between the first input end of the third comparator OP3 and a ground end. The resistor Rt is coupled between the transistor switch Qt and the ground end. The capacitor Ct is coupled to the transistor switch Qt, the first input end of the third comparator OP3, and the ground end.

The detail description of the voltage detection unit 10 and delay time control unit 20 can refer to description of the corresponding FIG. 4A and FIG. 4B and is omitted here for conciseness.

Refer to FIG. 3 again, at the time point t4, the detection signal $S_D$ provided from the voltage detection unit 10 is transited from the high-level state to the low-level state since the voltage detection unit 10 detects that the peak voltage of the AC power source $V_{AC}$ is less than the lower threshold voltage value $V_L$, i.e., the voltage detection unit 10 detects that the AC power source $V_{AC}$ is in the abnormal low voltage. At this time, the delay time control unit 20 receives the low-level detection signal $S_D$ to provide the low-level control signal $S_C$ at a time point t4' to turn off the switch unit 30, thereby interrupting the abnormal low-voltage AC power source $V_{AC}$ supplying power to the load 90 and preventing the load 90 being affected by the abnormal low-voltage AC power source $V_{AC}$.

Since the difference between the abnormal AC power source $V_{AC}$ detected at the time point t4 and the time point t1 is only the abnormal low voltage (the former) and the abnormal low voltage (the latter), the detailed operation of the voltage detection unit 10 and delay time control unit 20 while occurring the abnormal voltage is omitted here for conciseness.

Until a time point t5, the detection signal $S_D$ provided from the voltage detection unit 10 is transited from the low-level state to the high-level state since the voltage detection unit 10 detects that the AC power source $V_{AC}$ returns to be normal. The detailed operation of activating the delay control mechanism by the delay time control unit 20 is omitted here for conciseness.

Similarly, the length of the delay time Δtd to only one cycle time is not limited, and further the detection of the peak voltage of the AC power source $V_{AC}$ to determine whether the AC power source $V_{AC}$ is normal or abnormal is not limited. Moreover, once the AC power source is to be in the abnormal voltage again within the delay time Δtd, the control signal $S_C$ is continuously low-level to continuously turn off the switch unit 30, thereby interrupting the abnormal AC power source $V_{AC}$ supplying power to the load 90.

Figure 5:
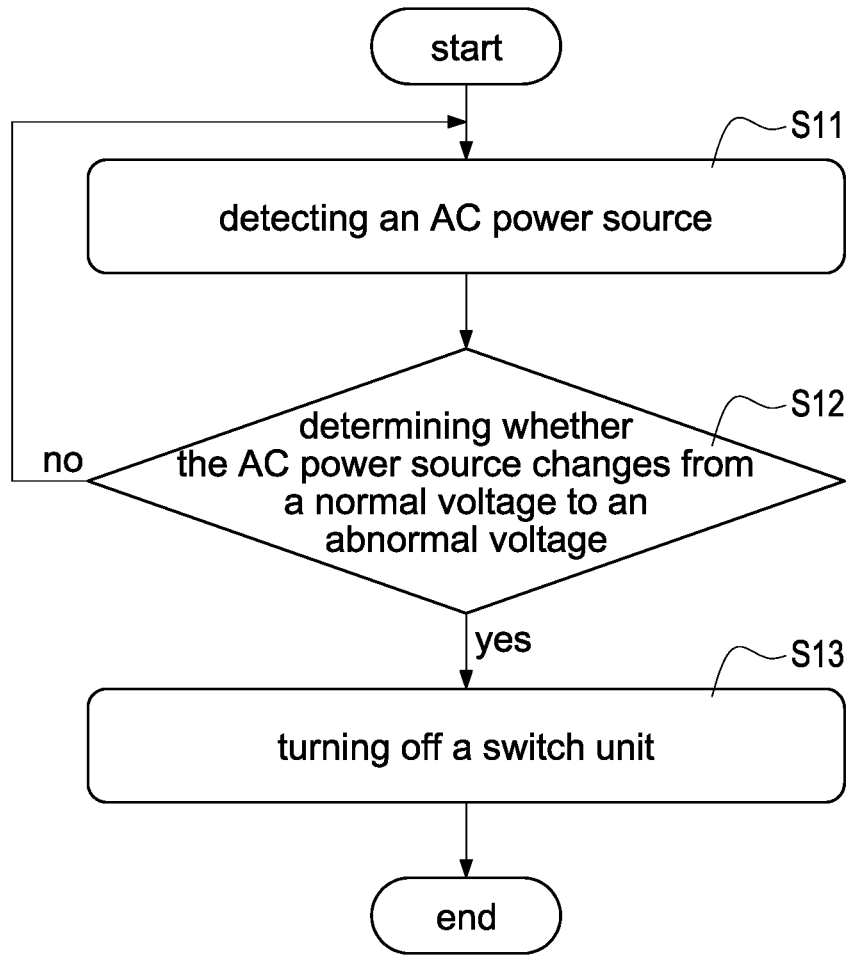
FIG. 5 is a flowchart of a method of operating the abnormal-voltage protection apparatus according to a first embodiment of the present disclosure.

Please refer to FIG. 5, which shows a flowchart of a method of operating the abnormal-voltage protection apparatus according to a first embodiment of the present disclosure. The abnormal-voltage protection apparatus is coupled to an AC power source and a load, and the abnormal-voltage protection apparatus comprises a voltage detection unit, a delay time control unit, and a switch unit. The switch unit is coupled to a power supplying path formed between the AC power source and the load.

The method of operating the abnormal-voltage protection apparatus according to the first embodiment includes steps as follows. First, detecting a voltage value of the AC power source (S11). The voltage detection unit is coupled to the AC power source, and receives the AC power source and provides a detection signal according to the voltage value of the AC power source. The detection signal provided by the voltage detection unit is corresponding to the voltage value of the AC power source. Also, the electrical information, such as voltage, current, frequency, and so on of the AC power source can be acquired according to the detection signal.

Afterward, determining whether the AC power source changes from a normal voltage to an abnormal voltage (S12). The voltage value of the AC power source is compared with a predetermined upper threshold voltage value and a predetermined lower threshold voltage value to determine whether a voltage level of the detection signal is transited so as to determine whether the AC power source changes from the normal voltage to the abnormal voltage. For example, when the detection signal is transited from a high-level state to a low-level state, it means that the AC power source is abnormal. When the AC power source does not change from the normal voltage to the abnormal voltage, it means that the AC power source is continuously normal. At this condition, the delay time control unit receives the high-level detection signal and outputs a high-level control signal to continuously turn on the switch unit so that the AC power source continuously supplies power to the load through the power supplying path. On the contrary, when the AC power source changes from the normal voltage to the abnormal voltage, it means that the AC power source is in an abnormal high voltage or abnormal low voltage. At this condition, the delay time control unit receives the detection signal transited from the high-level state to the low-level state and outputs a low-level control signal to turn off the switch unit (S13) and interrupt the AC power source supplying power to the load through the power supplying path.

Figure 6:
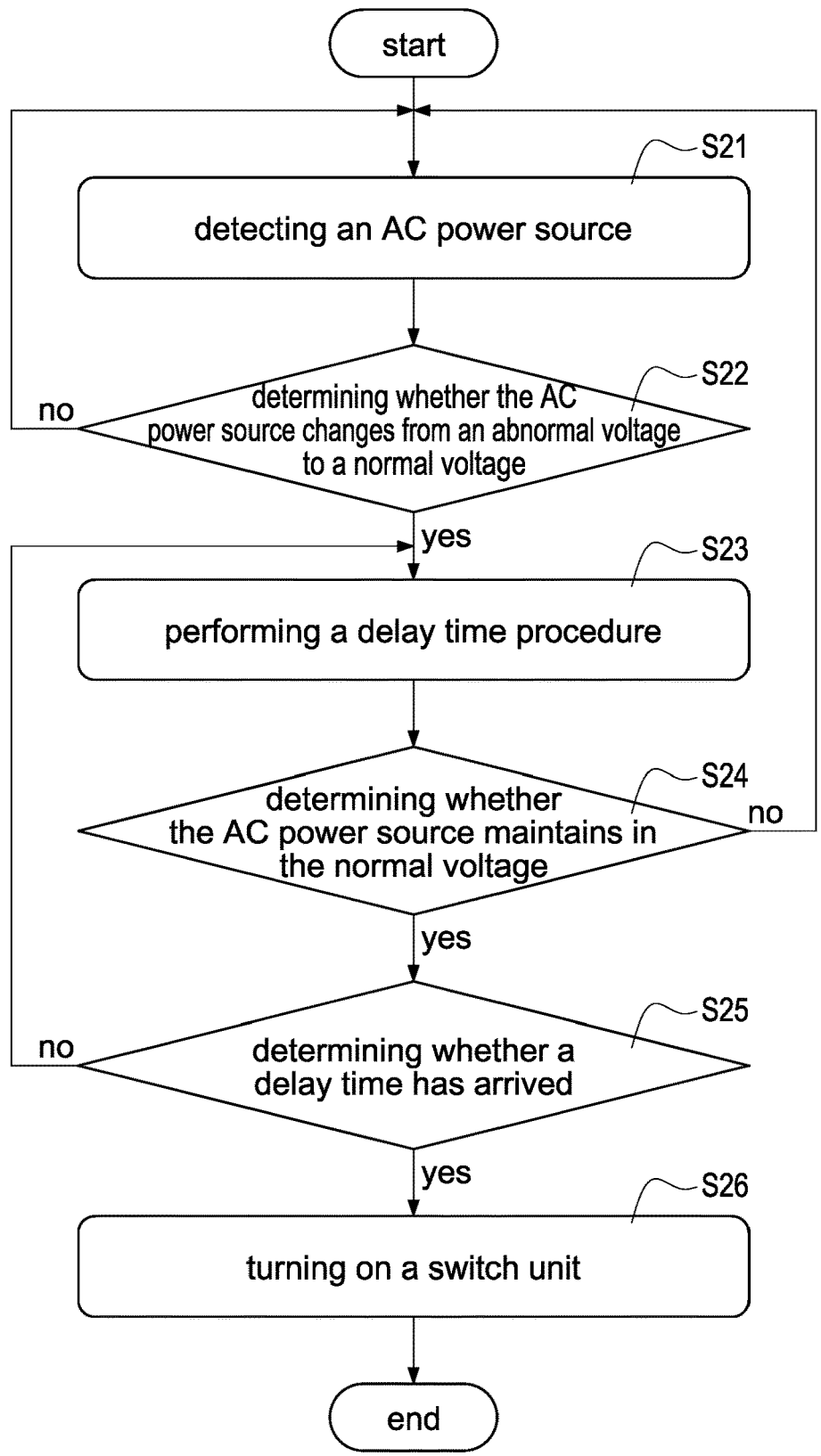
FIG. 6 is a flowchart of the method of operating the abnormal-voltage protection apparatus according to a second embodiment of the present disclosure.

Please refer to FIG. 6, which shows a flowchart of the method of operating the abnormal-voltage protection apparatus according to a second embodiment of the present disclosure. The method of operating the abnormal-voltage protection apparatus according to the second embodiment includes steps as follows. First, detecting a voltage value of the AC power source (S21). The voltage detection unit receives the AC power source and provides a detection signal according to the voltage value of the AC power source. The detection signal provided by the voltage detection unit is corresponding to the voltage value of the AC power source. Also, the electrical information, such as voltage, current, frequency, and so on of the AC power source can be acquired according to the detection signal.

Afterward, determining whether the AC power source changes from an abnormal voltage to a normal voltage (S22). The voltage value of the AC power source is compared with a predetermined upper threshold voltage value and a predetermined lower threshold voltage value to determine whether a voltage level of the detection signal is transited so as to determine whether the AC power source changes from the abnormal voltage to the normal voltage. For example, when the detection signal is transited from a low-level state to a high-level state, it means that the AC power source returns to be normal. When the AC power source does not change from the abnormal voltage to the normal voltage, it means that the AC power source is continuously abnormal. At this condition, the delay time control unit receives the low-level detection signal and outputs a low-level control signal to continuously turn off the switch unit so as to interrupt the abnormal AC power source supplying power to the load. On the contrary, when the AC power source changes from the abnormal voltage to the normal voltage, the delay time control unit receives the detection signal transited from the low-level state to the high-level state and activates a delay control mechanism.

The delay control mechanism comprises steps as follows. First, performing a delay time procedure by the delay time control unit (S23). The delay time procedure can be implemented by a hardware manner, such as a delay time circuit (for example but not limited to an R-C charge/discharge circuit), or other digital or analog circuits, a firmware manner, or a software manner to accumulate the delay time. Afterward, determining whether the AC power source maintains in a normal voltage (S24). If the AC power source does not maintain in the normal voltage, i.e., the AC power source again changes from the normal voltage to the abnormal voltage after the delay time procedure (S23), the delay time procedure exits to perform the step (S21) again, i.e., to detect the voltage value of the AC power source. At this condition, the AC power source is likely to be in the abnormal voltage again since the AC power source is still in an unstable condition. In order to avoid reducing life span of the switch unit and damaging the switch unit to fail to provide efficient and safe power supply to the load or rear-end circuits since the switch unit is frequently activated, the delay control mechanism activated by the delay time control unit 20 is necessary.

In other words, when the AC power source returns to be normal, i.e., the determination in the step (S22) is "Yes", the switch unit is not immediately turned on but the delay time procedure is performed to provide the delay time, i.e., the step (S23) and determining whether the AC power source is to be in the abnormal voltage again is performed, i.e., the step (S24). Once the AC power source is to be in the abnormal voltage again during the accumulation of the delay time, the delay time procedure exits to perform the step (S21) again. Also, the accumulated delay time is removed (returned to zero), and a new delay time is re-accumulated in the next required delay time procedure. Take the R-C charge/discharge circuit for example, the accumulated delay time is implemented by charging the capacitor, and the removed delay time is implemented by discharging the capacitor.

If the determination in the step (S24) is "Yes", i.e., the AC power source maintains in the normal voltage, determining whether the delay time has arrived during the delay time procedure (S25). If the determination in the step (S25) is "No", i.e., the delay time has not arrived, the delay time procedure is continuously performed in the step (S23), and further to determine whether the AC power source is to be in the abnormal voltage again, i.e., the step (S24). If the determination in the step (S25) is "Yes", i.e., the delay time has arrived and the AC power source maintains in the normal voltage during the delay time procedure, and therefore the delay time control unit provides the control signal to turn on the switch unit (S26) to make the normal AC power source supply power to the load through the power supplying path again.

In summary, the steps (S23)-(S25) are performed to ensure the switch unit is not immediately turned on but the delay time procedure is performed to provide the delay time when the AC power source returns to be normal, thereby avoiding frequently activating the switch unit. Moreover, if the AC power source is to be in the abnormal voltage again during the delay time procedure, the delay time procedure exits and the switch unit is continuously turned off, thereby interrupting the abnormal AC power source supplying power to the load.

In conclusion, the present disclosure has following features and advantages:

1. The delay control mechanism is activated when the AC power source returns to be normal from the abnormal voltage so as to provide efficient and safe power supply to the load or rear-end circuits and extend life span of the switch unit or relay switch.

2. The adjustment of length of the delay time and the provision of effective current discharging path can be implemented by designing different circuits with reset function of the delay time control unit and selecting different values of circuit components.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An abnormal-voltage protection apparatus comprising:
    a switch unit coupled to a power supplying path formed between an AC power source and a load;
    a voltage detection unit coupled to the AC power source in parallel, and the voltage detection unit configured to detect the AC power source and provide a detection signal according to a voltage value of the AC power source; and
    a delay time control unit coupled to the voltage detection unit and the switch unit, and configured to receive the detection signal and provide a control signal to directly control the switch unit according to the detection signal, wherein the delay time control unit comprises a capacitor,
    wherein the delay time control unit is further configured to produce a first voltage according to the detection signal, and compare the first voltage with a reference voltage to produce the control signal, and
    wherein when the voltage detection unit detects that the AC power source changes from an abnormal voltage to a normal voltage, the delay time control unit is further configured to increase the first voltage by charging the capacitor and the first voltage of the capacitor is increased, the delay time control unit is configured to directly turn on the switch unit by changing a level of the control signal after a delay time and until the first voltage is greater than the reference voltage so that the AC power source supplies power to the load through the power supplying path.

2. The abnormal-voltage protection apparatus of claim 1, wherein when the voltage detection unit detects that the AC power source changes from the normal voltage to the abnormal voltage, the delay time control unit directly turns off the switch unit by the control signal to interrupt the AC power source supplying power to the load through the power supplying path.

3. The abnormal-voltage protection apparatus of claim 1, wherein when a peak voltage of the AC power source is greater than an upper threshold voltage value or less than a lower threshold voltage value, the voltage detection unit detects that the AC power source is in an abnormal voltage.

4. The abnormal-voltage protection apparatus of claim 1, wherein when a valley voltage of the AC power source is less than a negative upper threshold voltage value or greater than a negative lower threshold voltage value, the voltage detection unit detects that the AC power source is in an abnormal voltage.

5. The abnormal-voltage protection apparatus of claim 1, wherein the delay time control unit is further configured to adjust the delay time according to a magnitude of the abnormal voltage.

6. The abnormal-voltage protection apparatus of claim 1, wherein the delay time control unit is further configured to adjust the delay time according to a duration time of the abnormal voltage.

7. The abnormal-voltage protection apparatus of claim 1, wherein the delay time control unit comprises:
    a comparator having a first input end, a second input end, and an output end; wherein the first input end receives the detection signal, the second input end receives the reference voltage, and the output end outputs the control signal; and
    a resistor coupled between the first input end and a ground end,
    wherein the capacitor is coupled between the first input end and the ground end.

8. The abnormal-voltage protection apparatus of claim 7, wherein the delay time control unit further comprises:
    a diode having a cathode end and an anode end; wherein the cathode end is coupled to the resistor, and the anode end is coupled to the capacitor.

9. The abnormal-voltage protection apparatus of claim 1, wherein the delay time control unit comprises:
    a comparator having a first input end, a second input end, and an output end; wherein the first input end receives the detection signal, the second input end receives the reference voltage, and the output end outputs the control signal;
    a transistor switch coupled between the first input end and a ground end; and
    a resistor coupled between the transistor switch and the ground end, wherein the capacitor is coupled to the transistor switch, the first input end, and the ground end.

10. The abnormal-voltage protection apparatus of claim 1, further comprising:
a fuse unit coupled in series to the power supplying path formed between the AC power source and the load;
wherein when a current flowing through the power supplying path is excessive, the fuse unit is disconnected to interrupt the current flowing to the load.

11. A method of operating an abnormal-voltage protection apparatus, the abnormal-voltage protection apparatus comprising a switch unit coupled between an AC power source and a load, a voltage detection unit, and a delay time control unit comprising a capacitor, the method comprising steps of:
(a) detecting, by the voltage detection unit coupled to the AC power source in parallel, a voltage value of the AC power source;
(b) performing, by the delay time control unit, a delay time procedure when the AC power source changes from an abnormal voltage to a normal voltage, and charging the capacitor to increase a first voltage of the capacitor; and
(c) directly turning on, through a control signal provided by the delay time control unit, the switch unit to make the AC power source supply power to the load through the switch unit after a delay time provided during the delay time procedure when the first voltage is greater than a reference voltage and the AC power source maintains in the normal voltage,
wherein said step (a) further comprises providing, by the voltage detection unit, a detection signal to the delay time control unit according to the voltage value of the AC power source,
wherein said step (b) further comprises performing, by the delay time control unit, the delay time procedure according to the detection signal,
wherein the delay time procedure comprises:
producing, by the delay time control unit, the first voltage according to the detection signal;
increasing, by the delay time control unit, the first voltage; and
comparing, by the delay time control unit, the first voltage with the reference voltage to determine whether the switch unit is turned on, and
wherein said step (c) comprises directly turning on, through the control signal provided by the delay time control unit, the switch unit when the first voltage is greater than the reference voltage, wherein the delay time is a time interval from increasing the first voltage to being greater than the reference voltage.

12. The method of operating the abnormal-voltage protection apparatus of claim 11, wherein in the step (c) comprising a step of:
directly turning off, through the control signal provided by the delay time control unit, the switch unit to interrupt the AC power source supplying power to the load and exit the delay time procedure when the AC power source changes from the normal voltage to the abnormal voltage within the delay time.

13. The method of operating the abnormal-voltage protection apparatus of claim 11, wherein after the step (a) further comprising a step of:
directly turning off, through the control signal provided by the delay time control unit, the switch unit to interrupt the AC power source supplying power to the load when the AC power source changes from the normal voltage to the abnormal voltage.

* * * * *